United States Patent [19]

Heck et al.

[11] Patent Number: 5,031,595
[45] Date of Patent: Jul. 16, 1991

[54] MALFUNCTION TEST PROCEDURE AND APPARATUS FOR IDLING CONTROL

[75] Inventors: Klaus Heck, Hohenacker; Manfred Mezger, Markgröningen; Günther Plapp, Filderstadt; Rüdiger Jautelat, Tamm; Stefan Huwig, Kornwestheim, all of Fed. Rep. of Germany

[73] Assignee: Robert Bosch GmbH, Stuttgart, Del.X

[21] Appl. No.: 466,308

[22] PCT Filed: Jun. 29, 1989

[86] PCT No.: PCT/DE89/00429

§ 371 Date: Mar. 20, 1990

§ 102(e) Date: Mar. 20, 1990

[87] PCT Pub. No.: WO90/01114

PCT Pub. Date: Feb. 8, 1990

[30] Foreign Application Priority Data

Jul. 20, 1988 [DE] Fed. Rep. of Germany ....... 3824631

[51] Int. Cl.[5] .......................... F02D 41/22; F02D 9/02
[52] U.S. Cl. ................. 123/339; 123/198 D; 73/118.1
[58] Field of Search .......... 73/118.1; 123/333, 198 D, 123/339

[56] References Cited

U.S. PATENT DOCUMENTS

| 4,067,306 | 1/1978 | Berich et al. | 123/198 D |
|---|---|---|---|
| 4,395,985 | 8/1983 | Hagen | 123/339 |
| 4,491,109 | 1/1985 | Kishi et al. | 123/361 |
| 4,519,360 | 5/1985 | Murakami | 123/361 |
| 4,541,378 | 9/1985 | Kitamura | 123/339 |
| 4,555,762 | 11/1985 | Ohgami et al. | 123/339 |
| 4,603,675 | 8/1986 | Junginger et al. | 123/352 |
| 4,612,615 | 9/1986 | Murakami | 123/361 |
| 4,622,936 | 11/1986 | Junginger et al. | 123/361 |
| 4,641,622 | 2/1987 | Murakami | 123/479 |
| 4,763,623 | 8/1988 | Sasaki | 123/339 |
| 4,779,597 | 10/1988 | Takaku et al. | 123/479 |
| 4,841,931 | 6/1989 | Ohm et al. | 123/399 |
| 4,850,320 | 7/1989 | Wokan et al. | 123/359 |
| 4,854,283 | 8/1989 | Kiyono et al. | 123/361 |

FOREIGN PATENT DOCUMENTS 0158343 9/1984 Japan .................... 123/339

Primary Examiner—Tony M. Argenbright
Assistant Examiner—Robert E. Mates
Attorney, Agent, or Firm—Walter Ottesen

[57] ABSTRACT

In a method for the malfunction testing of an idling control arrangement for an internal combustion engine, the closing function of the idling contact is checked. As soon as it is established that the contact should really be closed but that this is not the case, it is certain that there is either an interruption in the idling contact circuit or a servomotor fault. In order to be able to distinguish which of these faults is present, a test movement sequence is carried out in which the servomotor of the arrangement is activated and a check is made whether the throttle flap angle changes. If this is not the case, the servomotor is defective; otherwise, an interruption in the idling contact circuit is present. Using this method, it is for the first time possible to detect interruption and servomotor faults. Until now, it was only possible to detect short-circuit faults. Such short-circuit faults can also be detected using a method according to the invention, and in particular with greater reliability than so far, since a smaller angle is used in the test condition than until now.

10 Claims, 2 Drawing Sheets

MALFUNCTION TEST PROCEDURE AND APPARATUS FOR IDLING CONTROL

FIELD OF THE INVENTION

The invention relates to a method and to an apparatus for the malfunction testing of an idling control arrangement for an internal combustion engine.

BACKGROUND OF THE INVENTION

The currently produced idling control arrangement in accordance with the attached FIG. 1 has a throttle flap 10 which can be adjusted by means of an adjusting cable 11 or a servomotor 12. The setting angle ALPHA of the throttle flap 10 is determined from the voltage which is picked off at potentiometer terminals 13 from a potentiometer connected to the pivot axis of the throttle flap 10.

The servomotor 12 has an actuating housing 14 in which an actuating shaft 15 is arranged in such a way that it can be pushed back and forth. A part which can likewise be pushed back and forth, namely an idling-contact pin 16, is arranged in the actuating shaft 15 itself. In the position illustrated in FIG. 1, the free end of this contact pin 16 presses on an adjusting screw 17, which is threadably engaged in an actuating flange 18 connected to the pivot pin of the throttle flap 10. The actuating shaft 15 is displaced via a schematically represented electric drive 19 which either retracts or extends the actuating shaft 15 depending on the polarity of the voltage supplied to the drive. With respect to the explanation below, it is assumed that, deviating from the illustration according to FIG. 1, the actuating shaft 15 has been retracted to such an extent that the idling-contact pin 16 does not press on the adjusting screw 17. In this position, the idling-contact pin 16 is pushed out of the actuating shaft 15 as far as a stop (not shown) by a spring 20. It then does not press on an idling contact 21, which is therefore open. If the drive 19 is then supplied with voltage in such a way that it displaces the actuating shaft 15 to such an extent that the idling-contact pin 16 comes to rest against the adjusting screw 17, no rotation of the throttle flap 10 initially takes place as the actuating shaft 15 is pushed further out. Instead, the idling-contact pin 16 is first pushed into the actuating shaft 15 until it closes the idling contact 21 and cannot be closed any further. Only then is the throttle flap 10 rotated as the actuating shaft 15 is extended further. The illustration according to FIG. 1 corresponds to a position in which the idling contact 21 is closed.

If the servomotor 12 is in a certain position and the idling contact 21 is closed but the accelerator pedal is then pressed, that is, the adjusting cable 11 ensures a further opening of the throttle flap 10, the adjusting screw 17 lifts off from the idling-contact pin 16. As a result, the idling-contact pin 16 is pressed out of the actuating shaft 15 as far as its forward stop by the spring 20 and, as a result, the idling contact 21 opens. If this opening does not occur due to a fault or occurs but cannot be detected due to a short-circuit in the idling-contact drive circuit, the idling control arrangement remains active although idling conditions no longer exist. In order to detect this fault, the throttle flap angle ALPHA is monitored as to whether it reaches an angular range which characterizes full-load operation. If this is the case but the idling contact 21 is still closed, this indicates a fault in the idling-contact monitoring arrangement. As soon as this fault is detected, the actuating shaft 15 is retracted completely and then extended for a predetermined period so that it reaches a position in which, with the adjusting screw 17 resting against the idling-contact pin 16, the throttle flap assumes an angle ALPHA_EMERGENCY, which is sufficiently large to ensure that the internal combustion engine driven with the aid of the arrangement cannot stall. Idling control is simultaneously suppressed.

This method is relatively unreliable with respect to the detection of the short-circuit fault mentioned and it is completely incapable of detecting the converse fault, namely when the idling contact remains open continuously, or of detecting faults associated with the functioning of the servomotor.

SUMMARY OF THE INVENTION

The object of the invention is to provide a more reliable method for checking an idling control arrangement for malfunction. The invention is furthermore based on the object of providing an apparatus for carrying out such a method.

The method of the invention permits detecting and distinguishing interruption and servomotor faults. The closing function of the idling contact is checked and if the contact is not closed although this should in all probability be the case, the servomotor is subjected to a test movement. During this test movement, the throttle flap angle is monitored. If no change occurs in the throttle flap angle, this is an indication of the fact that there is a servomotor defect. If, on the other hand, the throttle flap angle changes with the driving of the servomotor but the idling contact is continuously open, this indicates that there is an interruption in the idling contact.

If an error has been detected, this is indicated; in the simplest case by an indicator lamp. In addition, the fault is suitably indicated by storing a corresponding value in a diagnostic memory. It is also advantageous to take emergency-running measures.

The test condition which checks the closing function of the idling contact can be of very complex configuration in order to ensure that test movements are only carried out if the probability of a fault has already been established as very high. A low number of test movements should be attained since each test movement results in behavior of the internal combustion engine which cannot be foreseen by the driver.

Of particular advantage is a test condition step, according to which the particular position of the actuating shaft after the opening of the actuating contact is estimated. The throttle flap angle ALPHA_PRESUMED associated with the particular position is determined, that is, that angle which the throttle flap assumes when the adjusting screw is resting against the actuating shaft and the actuating shaft is actually in the presumed position. The actual throttle flap angle is continuously compared with the presumed angle and if the actual angle has fallen below the presumed angle but the idling contact is still not closed, a fault is assumed. In itself, this condition is already very reliable but the number of fault indications can be further reduced by checking further conditions. In particular, it is advantageous to permit a test movement only if the accelerator pedal has been pressed once in the intervening period since the last test movement.

As explained, the detection of a servomotor fault is based on the fact that although the servomotor is activated, no change in the throttle flap angle is detected. It may by chance occur that the throttle flap is just then being adjusted via the adjusting cable precisely when the servomotor is activated. The throttle flap than rotates although, under certain circumstances, because of a fault, the actuating shaft does not move at all. In order not to obtain a chance fault indication due to this sequence, an advantageous further embodiment provides that the test movement sequence should contain at least one standstill test phase, in which the servomotor is not activated. If the throttle flap moves in a standstill test phase, this is an indication of the fact that the movement detected during the movement test phase was completely or partially produced via the adjusting cable. The test movement sequence thus does not permit a reliable diagnosis and must be repeated.

In the movement test phase, the throttle flap is rotated if the servomotor is working properly. It is advantageous to ensure that the rotation during the movement test phase does not lead to undesired running behavior of the internal combustion engine, this being achieved by the fact that the movement test sequence also contains a return test phase during which the throttle flap adjustment which was brought about during the movement test phase is essentially reversed.

If an interruption in the idling contact is detected, an advantageous further development provides that the throttle flap is set to an emergency-running angle. If, on the other hand, there is a servomotor fault, the procedure is such that the fuel supply is temporarily interrupted, specifically whenever the throttle flap angle falls below the maximum angle which can be set by the servomotor and the speed rises above an emergency-running speed.

The method according to coordinate claim 8 relates to the detection of a short-circuit fault of the idling contact. It is distinguished from the known method by the fact that the test angle used is not one in the full-load range but that the test angle is an angle which is only very slightly greater than the maximum setting angle which can be set by the servomotor. As soon as this test angle has been exceeded and an opening signal nevertheless fails to come from the idling contact, this indicates a short-circuit fault. The fault can also be detected by means of the method according to the invention if a driver moves the throttle flap only slightly beyond the idling position. In the known method, on the other hand, it was necessary for the full-load range to be reached. If a driver did not operate the internal combustion engine at full load over a prolonged period, the short-circuit fault remained undetected.

In the entire description so far it has been assumed that the idling contact is closed in the case of idling and otherwise is open. All the previous description and also the description which follows applies correspondingly also to the converse contact case, however.

The apparatus according to the invention is characterized in that it has a device which establishes whether a closing-function test condition is fulfilled. If this test condition is fulfilled, the device activates the servomotor in such a way that the latter should carry out a test movement. The device furthermore has an evaluation device for establishing whether the throttle flap angle indicates the desired test movement. If this is not the case, the evaluation device emits a fault signal to the indicating device.

The apparatus according to the invention is preferably realized by a microcomputer.

BRIEF DESCRIPTION OF THE DRAWINGS

The invention is explained in greater detail below with reference to the illustrative embodiments of FIGS. 2 and 3.

FIG. 1 shows a schematic plan view of a known idling control arrangement;

FIG. 2 shows a flowchart to describe a malfunction test method for detecting short-circuit, interruption and servomotor faults in an idling control arrangement; and, FIG. 3 shows a time diagram to illustrate a modified method of the type just referred to.

DESCRIPTION OF THE PREFERRED EMBODIMENT OF THE INVENTION

Figure 1:
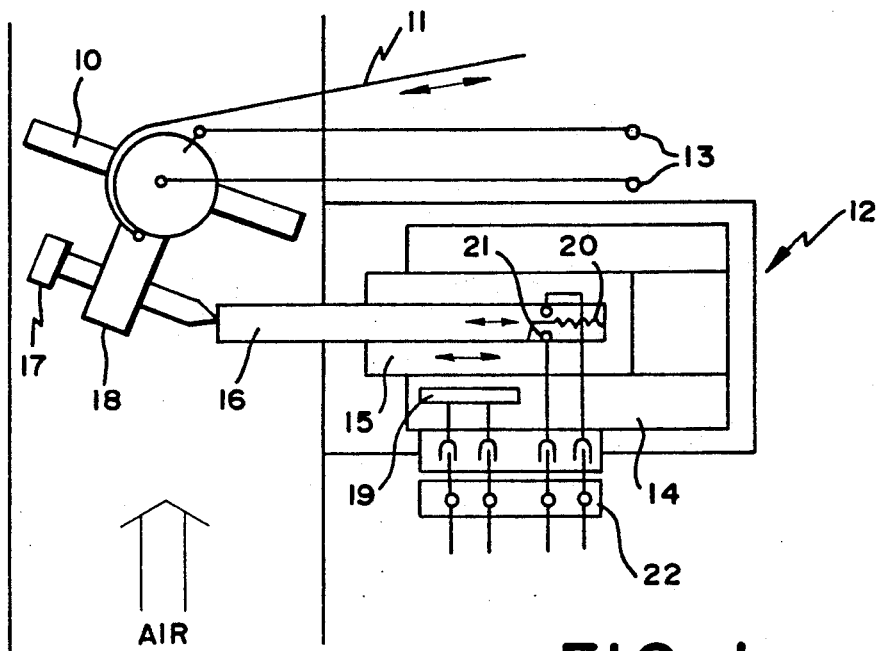
FIG. 1, relating to the prior art, has already been described.
Figure 2:
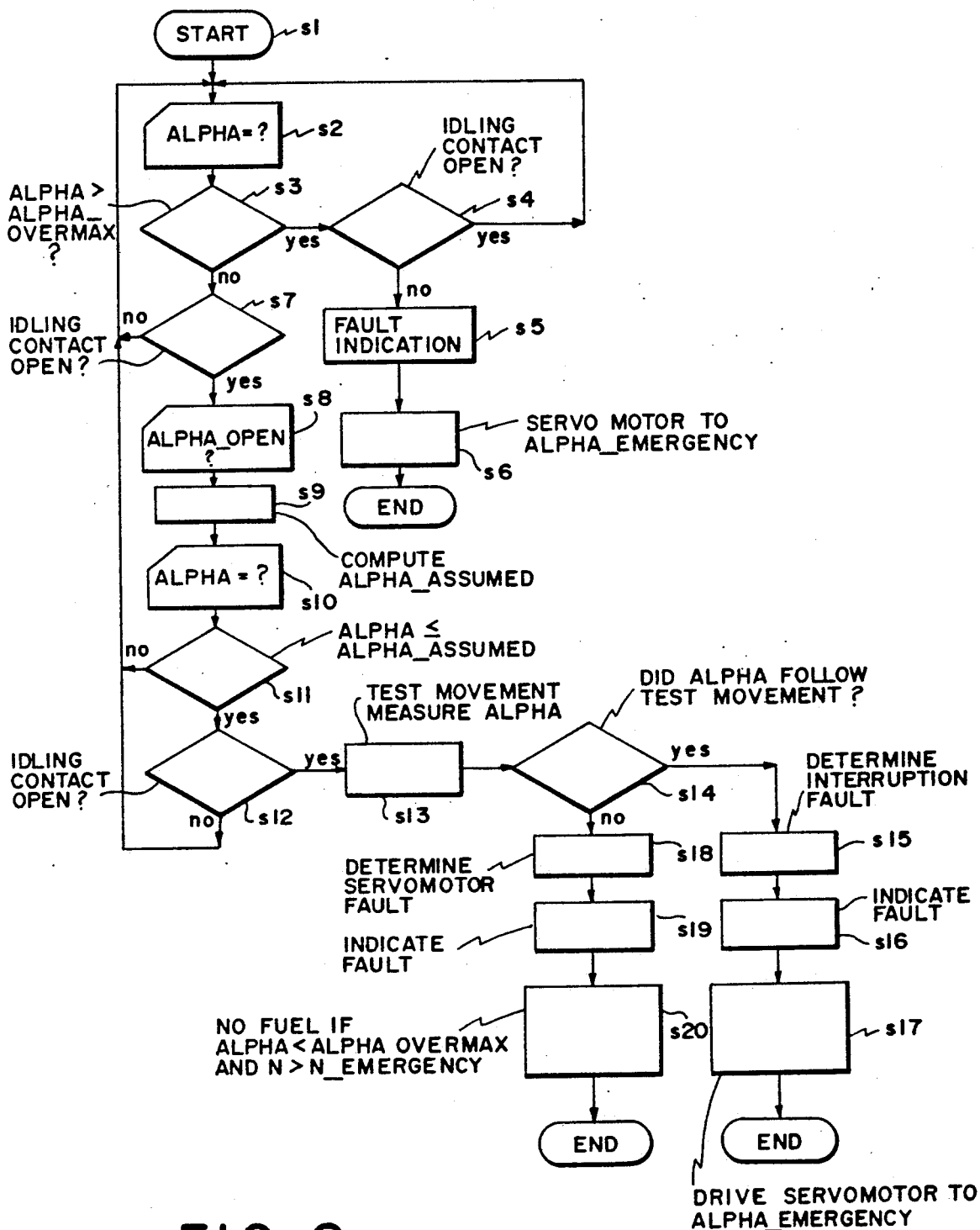

In the case of the embodiment illustrated by the flow diagram in FIG. 2, the throttle flap angle ALPHA is measured in a step S2 after a starting step S1. In a step S3, the angle ALPHA is compared to an angle ALPHA_OVERMAX. This step S3 represents a substep in the test for a short circuit of the idling contact. If the outcome of the comparison in accordance with step S3 is yes and, if during the subsequent investigation in a step S4, it is established that the idling contact is not open, this indicates a short-circuit fault. In a step S5, this fault is indicated and, in a step S6, the servomotor is driven to a position such that the throttle flap angle ALPHA_EMERGENCY is established when the adjusting screw 17 explained with reference to FIG. 1 rests against the idling-contact pin 16. The procedure then ends in accordance with the embodiment shown in FIG. 2.

If, in step S4, it is established that the idling contact is open, this corresponds to proper operation and the monitoring sequence begins again with step S2.

The comparison angle ALPHA_OVERMAX used in step S3 is an angle which is as close as possible above that throttle flap angle ALPHA_MAX which the throttle flap assumes when it is rotated by the maximum actuating stroke of the actuating shaft 15. In the case of proper operation, the idling contact must open as soon as the actual throttle flap angle ALPHA is above this maximum angle ALPHA_MAX. If the actual angle is still below the comparison angle, the described check for a short-circuit fault cannot yet be carried out and the procedure jumps to a step S7 in which, precisely as in step S4, a check is effected as to whether the idling contact is open. If this is not the case, the sequence returns to step S2. If step S7 is then reached again but the idling contact has opened in the intervening period, a step S8 is reached in which the current angle ALPHA has registered as angle ALPHA_OPENING, that is, as that angle at which the idling contact opened. This angle does not coincide exactly with the actual angle at which opening occurred since, of course, the angle is only acquired when step S8 is reached. In correct operation, step S8 is reached, for example, every 5 ms. Within this short period of time, the throttle flap angle changes only slightly, even if the throttle flap is rapidly adjusted via the adjusting cable 11. The delay in angle measurement due to the time pattern of the program sequence therefore does not lead to any significant error.

The opening of the idling contact even below the above-mentioned angle ALPHA_MAX is not unusual since in idling control, the actuation shaft 15 can be moved out only a little, for example when the internal combustion engine is warm, and the throttle flap is adjusted via the adjusting cable 11 from this position. However, opening may also have occurred due to an interruption in the idling contact circuit, that is, due to the fact that a contact plug 22 (FIG. 1) has fallen off. In order to establish whether opening occurred as a result of a fault, test steps S9 to S12 follow.

In step S9, a throttle flap angle ALPHA__PRESUMED is computed, this being the angle which the throttle flap must occupy if it is resting against an actuating shaft located in a presumed position. The angle ALPHA_PRESUMED is composed of the explained angle ALPHA_OPENING and a correcting angle ALPHA_CORRECTION. The correcting angle comprises an angle ALPHA_OV, which characterizes an angle change due to overshooting of the servomotor.

In step S10, the current throttle flap angle ALPHA is measured and, in step S11, is compared to the presumed angle ALPHA_PRESUMED computed in step S9. If it is established that the actual angle has fallen below the presumed angle or is equal to the latter, then a check is performed in step S12 as to whether the idling contact is closed, which should be the case. If the result expected for correct operation is in fact established, the procedure returns to step S2. The program also returns there from step S11 if it is established that the actual angle is still greater than the presumed angle. If, after returning to step S2, step S8 is run through again, the current angle must not be measured there again as opening angle ALPHA_OPENING. To ensure this, an opening flag is set as soon as the program first leaves step S8, said flag being cancelled whenever it is established in step S7 that the idling contact is not open. Step S8 is only performed when the flap has been cancelled. Otherwise, the angle ALPHA_OPENING stored during the first run-through is retained.

If it is established in step S12 that the idling contact is still open although the actual throttle flap angle is already below the presumed angle, a test movement subroutine is carried out in a step S13, in which the servomotor is activated in such a way that it should move. The throttle flap angle ALPHA is simultaneously measured. If the test movement sequence is evaluated in a step S14 and during this it is established that the throttle flap angle followed the test movement, this is an indication that the servomotor is operating correctly but that the idling contact has an interruption since it did not close even though the throttle flap was resting against the actuating shaft. This discovery is accomplished in a step S15 and is indicated in a step S16. In step S17, an emergency-running adjustment is carried out, which is identical to that mentioned above under step S6.

If, on the other hand, it is established in step S14 that the throttle flap angle did not follow the actuating shaft, it is established in a step S18 that there is a servomotor fault, which is indicated in a step S19. In a step S20, an emergency-running subroutine is performed, this subroutine consisting in the fuel supply being interrupted whenever the actual throttle flap angle ALPHA drops below the above-mentioned angle ALPHA_OVERMAX and the speed simultaneously rises above an emergency-running speed N_EMERGENCY.

The fault indication in accordance with steps S5, S16 and S19 is effected via a warning lamp and, additionally, by the corresponding fault being written into a diagnostic memory. If the warning lamp lights up, the vehicle operator drives to the diagnosis station and the latter evaluates the contents of the diagnostic memory. To ensure that the diagnostic memory receives as reliable information as possible, it is advisable not to break off the explained procedure according to steps S6 or S17, this having been the premise from which the explanation proceeded so far, but to run the test procedure again in order to establish whether the initially reported fault has not been simulated by some other fault. Thus, in particular, a further fault diagnosis with respect to the reliability of the throttle flap potentiometer can be carried out. If it is established in a check of the throttle flap potentiometer that this is operating inaccurately, it is advantageous to delete a previously detected servomotor fault. This prevents an unnecessary replacement of a servomotor. Only if the servomotor fault is detected again after the throttle flap potentiometer has been repaired is it certain that this is what is present.

Driving of the servomotor to achieve the emergency-running angle ALPHA_EMERGENCY according to steps S6 and S17 can be effected as explained above with reference to the prior art. However, it is more advantageous to run out the servomotor not only for a predetermined period of time, starting from its completely retracted position, but to carry out such a run out only in a first step. If thereafter it is established that the continuously monitored throttle flap angle can fall below the angle ALPHA_EMERGENCY, this discovery is used to extend the actuating shaft in small predetermined steps until no further falling of the actual throttle flap angle below the emergency-running angle is detected.

In the method according to FIG. 2, the only condition for triggering the test movement is the discovery that the actual throttle flap angle has fallen below the presumed angle but that the idling contact is nevertheless open. Using this condition alone, the test movement would be triggered relatively frequently since the presumed angle is subject to a relatively wide error range. This is because only an inaccurate estimate is possible with the design known at present of how far the actuating shaft 15 is in fact run out or retracted within a predetermined period of time. If an arrangement is used which permits a very accurate prediction of the position of the actuating shaft on the basis of the activation times of the servomotor 12, the condition explained with reference to FIG. 2 for triggering the test movement may be fully sufficient.

Figure 3:
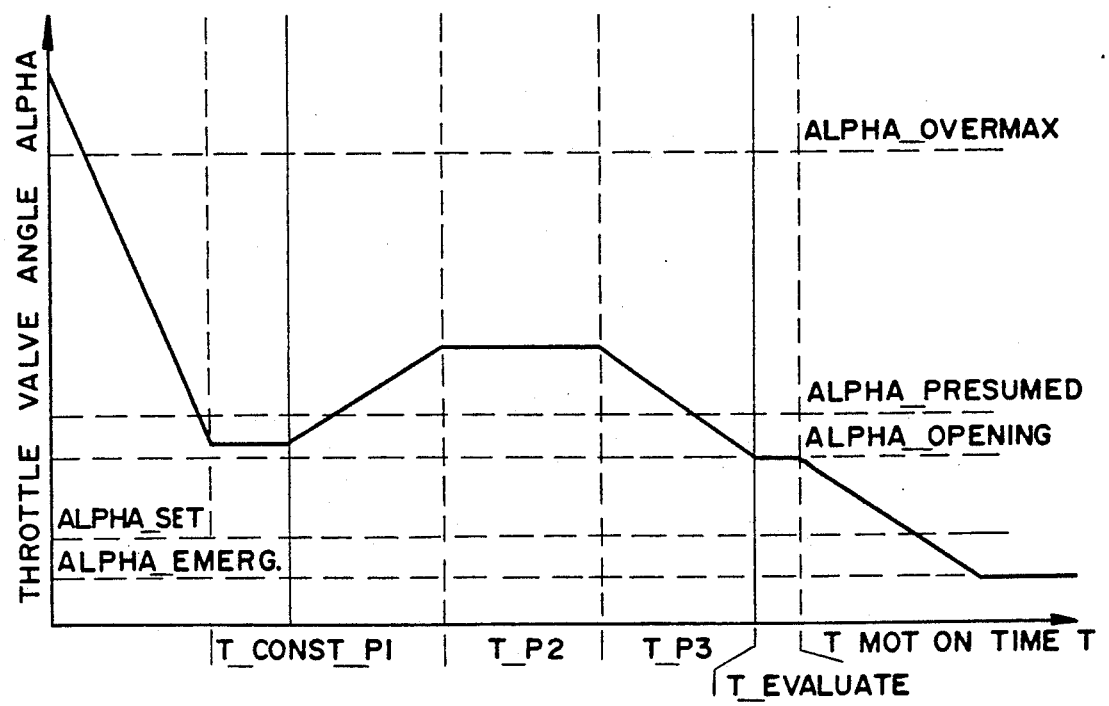

Starting from the time diagram according to FIG. 3, variations of the basic method according to FIG. 2 are now explained. To trigger the test movement, the following conditions must be fulfilled:
(1) The throttle flap angle ALPHA must be smaller than ALPHA_PRESUMED, which angle is computed in the manner indicated above;
(2) No throttle flap movement must have taken place for a predetermined time T_CONST;
(3) Since the last test movement, the throttle flap angle ALPHA must have exceeded the above-mentioned ALPHA_OVERMAX, that is, a depression of the accelerator pedal must have been detected;
(4) The desired angle ALPHA_DESIRED for idling control must be considerably smaller than the presumed angle ALPHA_PRESUMED; and,
(5) The throttle flap angle ALPHA must be greater than the above-mentioned emergency-running angle ALPHA_EMERGENCY.

These angles are plotted in FIG. 3 along the ordinate. The abscissa is the time axis. Ahead of the period of time T_CONST mentioned, there is a period in which the throttle flap angle ALPHA falls from values above the angle ALPHA_OVERMAX to below the presumed angle ALPHA_PRESUMED. During the period of time T_CONST, the angle remains constant. The other above-mentioned conditions are also fulfilled, as can immediately be seen by comparing the actual angle to the threshold angles mentioned. A test movement sequence is therefore initiated at the end of the period of time T_CONST.

In contrast to the test movement sequence explained on the basis of FIG. 2, the test movement sequence according to FIG. 3 is divided into three phases, specifically a first phase of duration T_P1, a second phase of duration T_P2, and a third phase of duration T_P3. In the first phase, the servomotor is activated for the time T_P1. In the case illustrated, the servomotor is in order, with the result that the throttle flap angle ALPHA follows the movement of the actuating shaft. In the second phase, the servomotor is not activated, the throttle flap angle thus remaining unchanged. In the third phase, the servomotor is retracted again. In this arrangement, time period T_P3 corresponds to time period T_P1 of the first phase. It is here assumed that the running-in velocity is equal to the running-out velocity. If the velocities are different, the running-in time is to be made such that the throttle flap returns to the starting position before initiating the test movement sequence. Return can also be assured by continuously comparing the current throttle flap angle to the starting angle at the beginning of the test movement and halting the activation of the servomotor only when the actual angle once more corresponds to the starting angle.

The test movement sequence is followed by an evaluation time period T_EVALUATION, in which a test is carried out as to whether the throttle flap angle changed at least during phase 1. If this is established, a check is carried out as to whether the throttle flap remained stationary during phase 2. If this is not the case, the movement must have been caused by the driver and it is also unclear whether the movement during phase 1 was caused by the driver. The test movement therefore cannot be evaluated reliably and a further test movement sequence follows as soon as the conditions required for this are again all fulfilled. If, however, the movement in test 1, if checked, is also detected in phase 3 but no movement took place in phase 2, this is an indication that the servomotor is operating correctly and the only remaining cause of a fault is an interruption of the idling contact. During a time T_MOT_ON, therefore, the servomotor is operated to run in the actuating shaft. The time is chosen so that the actuating shaft reaches a position which corresponds to the above-mentioned emergency-running angle ALPHA_EMERGENCY. If, on the other hand, it is established during the evaluation phase T_EVALUATION that no change in the throttle flap angle took place in any of the test movement phases, the emergency measure for fuel injection explained above is activated.

In the embodiments described, the angle ALPHA_OVERMAX which was explained was used for three different purposes, namely to establish whether a short-circuit fault is present, to establish whether the acceleration pedal had been pressed since the last test movement sequence and to establish one of the conditions for emergency running after a servomotor fault had been detected. Depending on the particular application, the angles for the three purposes mentioned can, however, also be chosen according to different criteria, with the result that they are no longer all equal.

It has already been mentioned initially that the angle ALPHA_MAX is about 20°. The overshoot angle ALPHA_OV is typically about 1°. In a trial run, the adjustment movement during the test movement sequence corresponds to about 2°. The angle difference according to above-mentioned condition (4) is likewise about 2° in the trial example. The time T_CONST can be a few 100 ms. The size of the emergency-running angle ALPHA_EMERGENCY depends very much on the type of internal combustion engine to be controlled. The magnitude of this angle can further be varied as a function of the engine temperature, so that for each temperature it is assured that the internal combustion engine will not run too fast or stall either.

An apparatus for checking the interruption fault and the servomotor fault has a device for monitoring the test conditions and for performing the test movement sequence. There is also an evaluation device for the evaluation described of the test movement sequence and for emitting a fault signal.

Attention is drawn to the fact that checking for interruption or for a servomotor fault is interrupted as soon as it is established that the idling contact has closed in the meantime. The position of this contact is therefore continuously checked. The procedure also returns to its starting point when the closing of the contact is detected during the test movement or during the emergency-running phase, provided that the procedure does not end completely with the setting of the emergency-running phase but is continued as mentioned above as a variant.

We claim:
1. A method of fault testing an idling control arrangement of an internal combustion engine having a throttle flap, the idling control arrangement including a servomotor for adjusting the angle of the throttle flap, a measuring device for measuring the angle of the throttle flap and an idling contact circuit having an idling contact movable between a closed position during idling and an open position, the method comprising the steps of:
   checking the closing function of the idling contact and if this check determines that the idling contact is open, then
   triggering a test movement sequence by activating the servomotor to cause the servomotor to perform a test movement to change the angle of the throttle flap;
   measuring the angle of the throttle flap and, if no change occurs in the angle of the throttle flap during this test movement, inferring a servomotor fault, or, if a change in the angle is detected, inferring a fault in the idling contact circuit; and,
   indicating the fault.
2. The method of claim 1, comprising the further steps of:
   measuring the throttle flap angle present when the idling contact opens and using this angle as a first angle for the case wherein the idling contact is open;
   correcting the first angle as required using correction angles which correspond to the movements of the servomotor which the latter carries out during the time in which the idling contact is open thereby obtaining a presumed angle; and, continuously comparing the throttle flap angle to the presumed angle with a pregiven test condition according to this test condition step being fulfilled when the throttle flap angle is equal to or less than the presumed angle.

3. The method of claim 2, wherein the test condition for triggering the test movement sequence includes the additional requirement that the throttle flap angle must have been greater at least once since the last test movement sequence than an opening test angle which is greater than the maximum throttle flap angle which can be set by the servomotor.

4. The method of claim 2, wherein the test movement sequence contains at least one standstill test phase, in which the servomotor is not activated, and in that the test movement sequence is only then evaluated if no change in the throttle flap angle has been detected during the standstill test phase.

5. The method of claim 2, wherein the test movement sequence contains a return test phase during which the throttle flap adjustment brought about during the movement test phase is essentially reversed.

6. The method of claim 2, wherein the servomotor is operated until the throttle flap angle takes on essentially an emergency-running angle when an interruption has been detected in the idling circuit.

7. The method of claim 2, wherein, in the event that a servomotor fault is detected, an interruption signal for the interruption of the fuel supply is emitted when the throttle flap angle falls below the maximum angle which can be adjusted by the servomotor and the speed of the internal combustion engine rises above an emergency-running speed.

8. A method of fault testing an idling control arrangement of an internal combustion engine having a throttle flap, the idling control arrangement including: a servomotor for adjusting the angle of the throttle flap, a measuring device for measuring the angle of the throttle flap and an idling contact circuit having an idling contact movable between a closed position during idling and an open position, the method comprising the steps of:

continuously comparing the throttle flap angle to a test angle and inferring a short circuit fault in the idling contact circuit whenever the throttle flap angle is greater than the test angle but the idling contact is nevertheless not open;

indicating the fault; and, said test angle being greater, to the least extent possible, than the maximum angle which can be adjusted by the servomotor.

9. The method of claim 8, wherein the idling contact is closed during idling and is otherwise open.

10. An apparatus for testing an idling control arrangement of an internal combustion engine having a throttle flap, the idle control arrangement including a servomotor for adjusting the angle of a throttle flap movable through a desired test movement, a measuring device for measuring the throttle flap angle and an idling contact which is closed during idling, the apparatus comprising:

a device for determining if a closing function test condition is fulfilled and, if the test condition is fulfilled, activating the servomotor in such a way that the servomotor should carry out a test movement;

an evaluation device for determining if the throttle flap angle indicates the desired test movement and for emitting a servomotor fault signal if such an indication is not provided and for emitting an interruption fault signal if such an indication is provided; and, an indicating device for indicating a fault.

* * * * *

UNITED STATES PATENT AND TRADEMARK OFFICE
CERTIFICATE OF CORRECTION

PATENT NO. : 5,031,595

DATED : July 16, 1991

INVENTOR(S) : Klaus Heck, Manfred Mezger, Günther Plapp, Rüdiger Jautelat and Stefan Huwig It is certified that error appears in the above-identified patent and that said Letters Patent is hereby corrected as shown below:

On the title page: under "Assignee", item [73], line 2: delete "Del.X" and substitute -- Fed. Rep. of Germany -- therefor.

In column 3, line 4: delete "than" and substitute -- then -- therefor.

In column 4, line 16: delete "EMBODIMENT" and substitute -- EMBODIMENTS -- therefor.

Signed and Sealed this

Eighteenth Day of May, 1993

Attest:

MICHAEL K. KIRK

*Attesting Officer*     *Acting Commissioner of Patents and Trademarks*